United States Patent

Blitz et al.

[11] 3,893,697
[45] July 8, 1975

[54] LOADING AND UNLOADING SYSTEM FOR BUS

[75] Inventors: Carmont Blitz; Hari N. Agrawal; Leon S. Oliver, all of Chicago, Ill.

[73] Assignee: The Blitz Corporation, Chicago, Ill.

[22] Filed: May 16, 1973

[21] Appl. No.: 360,762

[52] U.S. Cl............... 303/6.1; 180/111; 214/77 R; 214/DIG. 10
[51] Int. Cl............................................. B60t 7/12
[58] Field of Search...214/75 R, 77 R, 77 P, DIG. 10; 180/111, 112, 113; 303/601; 105/446

[56] References Cited
UNITED STATES PATENTS

| | | | |
|---|---|---|---|
| 1,601,732 | 10/1926 | Forman | 303/6.1 |
| 1,739,714 | 12/1929 | Dolan | 180/111 X |
| 1,784,310 | 12/1930 | Pardee | 303/6.1 |
| 1,879,674 | 9/1932 | Fitch | 303/6.1 |
| 2,071,754 | 2/1937 | Hewitt | 303/6.1 |
| 2,469,321 | 5/1949 | Wood | 214/77 P |
| 2,782,028 | 2/1957 | Almond | 180/112 X |
| 3,258,139 | 6/1966 | Ridgeway | 214/77 P |

Primary Examiner—Robert J. Spar
Assistant Examiner—L. J. Paperner
Attorney, Agent, or Firm—Max R. Kraus

[57] ABSTRACT

A loading and unloading system for a bus includes a generally flat platform upon which a person in a wheel chair can be moved into position from a sidewalk or roadway into the bus on the floor thereof or reverse. The bus has the usual air operated doors which open or close and permit use of conventional steps for normal movement of a passenger into the bus or departure from the bus. In order to accommodate a crippled or disabled person and particularly one in a wheel chair, a generally flat platform sufficiently large upon which a wheel chair may rest is provided. Sensing means to insure the proper positioning of a wheel chair is provided after which power means can be activated for elevating the platform from ground level to bus floor level or reverse. During movement of the platform it is maintained in a generally horizontal position. To provide adequate safeguards, the platform moving means is interlocked with the power means for operating the doors to the bus interior and with the brake system of the bus so that bus movement or door movement during movement of the platform is impossible. The bus may be equipped with a conventional rear door and steps. While the bus may otherwise be used in conventional fashion, its preferred field of application is in connection with pick-up or discharge of crippled passengers who would normally be unable to utilize public conveyances such as conventional busses.

11 Claims, 8 Drawing Figures

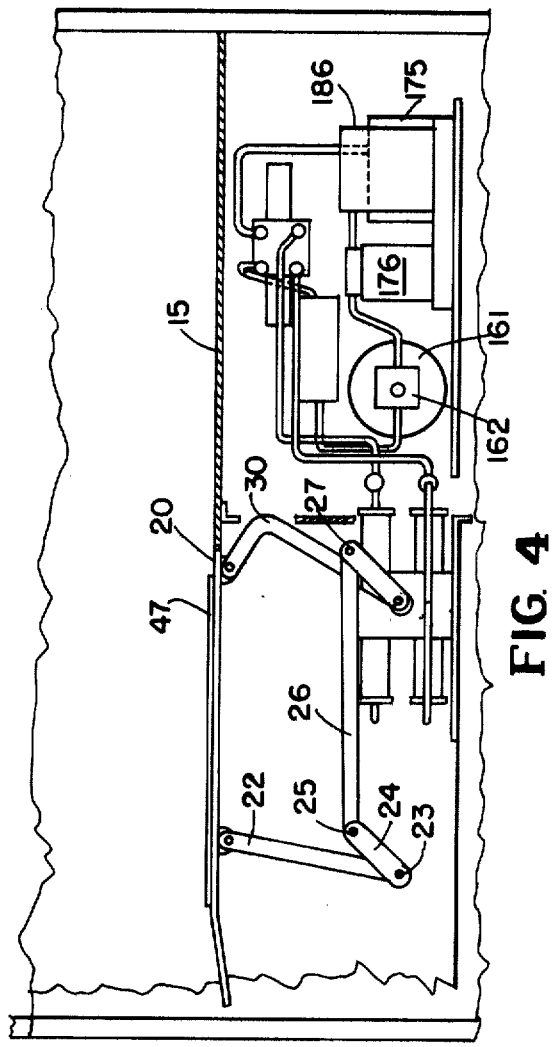
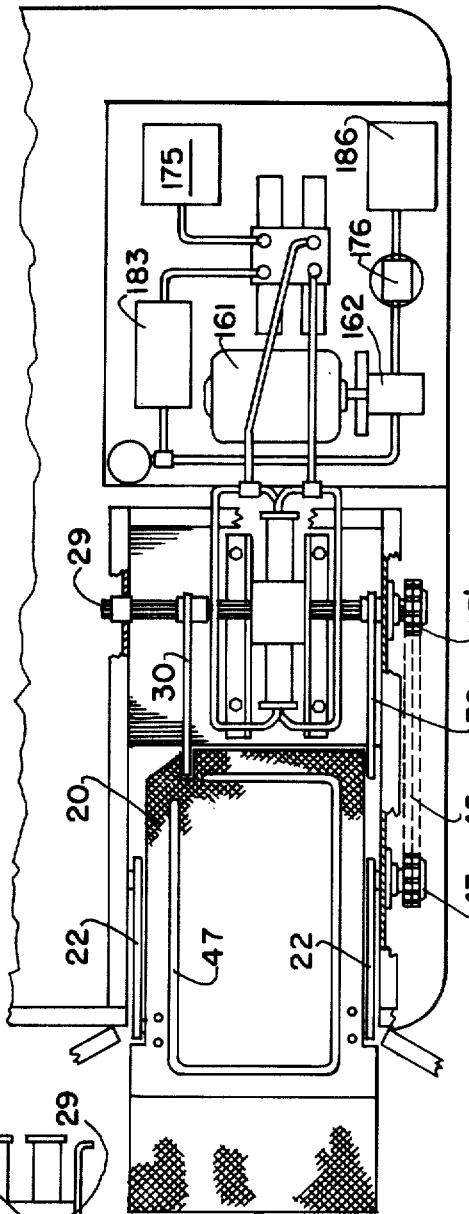
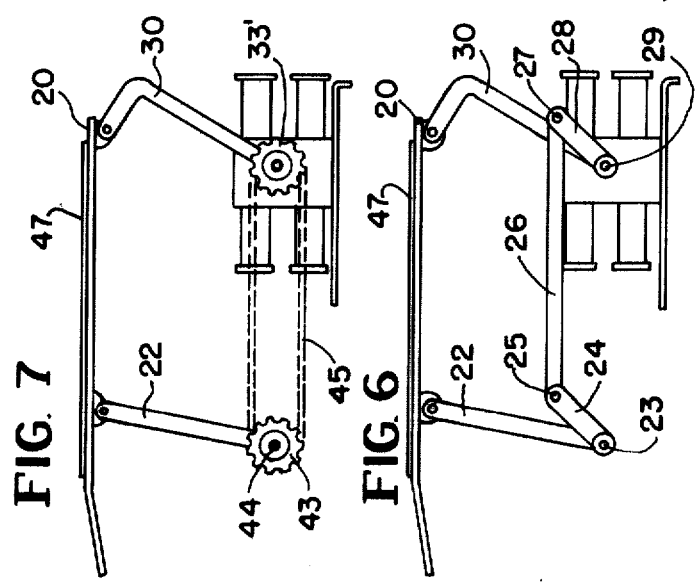

3,893,697

LOADING AND UNLOADING SYSTEM FOR BUS

INTRODUCTION

The invention to be disclosed herein relates to a bus - a power driven vehicle under the control of a driver and used for accommodating passengers for transportation purposes - and is particularly useful for handling passengers who are crippled or who are in wheel chairs and are normally unable to negotiate bus stairs. The invention may also be used on cars or railroad coaches.

Many instances occur where transportation of non-ambulatory persons must be provided on a bus. In some instances, the bus passenger, whether in a wheel chair or not, is unable to negotiate the three or four steps available between ground level and the bus floor level. The problem of entering into or exiting from a bus for cripples who are non-ambulatory and are confined to hywheel chairs is particularly acute. While such persons may be able to sit in class or study, a major impediment comes into play in connection with transporting such individuals.

While busses have been provided with power driven lifts for handling wheel chairs, and while trucks are frequently provided with lifts for handling heavy loads, serious drawbacks to such equipped busses and/or trucks are present, due principally to the lack of coordination of the power driven equipment. In particular, systems for handling non-ambulatory passengers in trucks or busses have caused injury to such people due to unexpected opening or closing of doors, a bus starting to move, either under its own power or because of the location of the bus or truck on a hill, during the time that a non-ambulatory passenger is in the process of negotiating entry into or exit from a bus.

THE INVENTION GENERALLY

The invention herein is concerned with a bus provided with a power operated platform for use by a bus passenger in connection with entering into or leaving from the bus. The platform is maintained generally flat and horizontal and is sufficiently strong so that a passenger in a wheel chair (or not) can be picked up from ground level and elevated into the bus under conditions where definite safety is provided. The invention provides interlocking means involving the bus doors and the platform so that no power operation of the platform is possible except under suitable and safe conditions. The platform operating means is so controlled and interlocked with the doors that platform operation from one level to another occurs only when the bus doors are in open position and are locked against closure. In addition, the system provides for an interlock between the platform operating means and a brake system of the bus so that while the platform operating means is active — moving a passenger from one position to another, bus travel is rendered impossible because of the application of bus brakes. A further safety feature resides in the fact that so long as a passenger and his wheel chair are resting on the platform, even with the bus doors closed, means responsive to the proper disposition of weight upon the bus platform interlocks to provide complete safety. Thus if a wheel chair (or passenger) is not properly positioned on the platform, further operation of the bus or its equipment is inhibited.

DESCRIPTION OF THE DRAWINGS

In connection with the description of a preferred embodiment of the invention, reference will now be made to the drawings wherein:

FIG. 4 is an elevation of the mechanism embodying the present invention as installed in a bus.

FIG. 5 is a plan view of the mechanism shown in FIG. 4, except that the linkage system of FIG. 7 is shown.

FIG. 6 is a view of the linkage system between the hydraulic motor and the passenger carrying platform.

FIG. 7 is a view similar to FIG. 6 but showing a modified form of linkage; and

DESCRIPTION OF THE PREFERRED SPECIES

Figure 1:
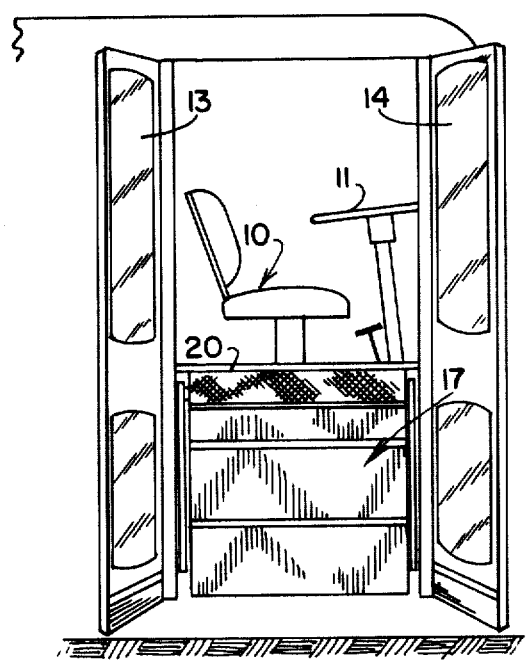
FIG. 1 is a side elevation of a bus cab showing a passenger supporting platform in the up position, the bus doors being open and the interlock preventing bus travel.
Figure 2:
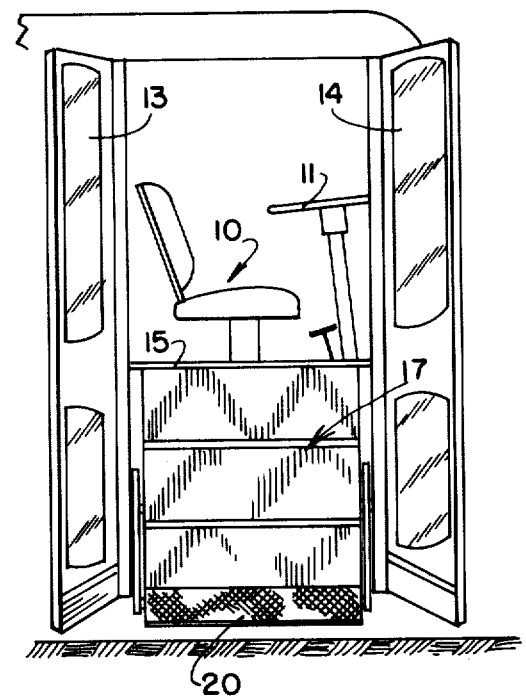
FIG. 2 is a view similar to FIG. 1 showing the passenger supporting platform in the down position at ground level.

The invention is illustrated and described as being applied to a bus although it will be understood that it is equally applicable to a truck or railroad coach. The cab part of a bus is illustrated in FIGS. 1 and 2 and in particular, driver's seat 10 is illustrated behind steering wheel 11, both being on the left side of the front portion of the bus. When necessary and where a bus or vehicle moves forward on the left half of the road (as true in England and certain other countries), the driver's seat and steering wheel will be disposed to the right of the bus. In either case, opposite to the driver's seat bus doors 13 and 14 are provided. It is understood that the hand or foot controls for starting and/or stopping the bus and other controls are all disposed within reach of the driver of the bus. The bus interior has floor 15 which is normally above ground level and has steps 17 for normal entry or exit between bus floor 15 and ground. The bus is normally equipped with power means for opening or closing the bus doors, such power means usually being air actuated. In addition, the bus is normally equipped with power brakes, which may be air operated or hydraulic.

In accordance with the present invention, platform 20 is provided. Platform 20 is supported in a generally horizontal position and is adapted to be positioned in either a normal top position, as illustrated in FIG. 1, or a temporary bottom position, as illustrated in FIG. 2. In the top position of the platform, as illustrated in FIG. 1, the platform is generally level with the bus floor 15 and provides a support above the well in the bus normally present when steps 17 of the bus are available for use. Platform 20 is preferably of steel or aluminum or other strong material and is adapted to support the weight of several normal people as well as a wheel chair in which a person may be seated. Platform 20 is sufficiently large dimensionally so that it can accommodate a wheel chair with a person in it and possibly an additional person who may be moving or pushing the wheel chair.

Platform 20 is supported on a linkage system adapted to translate the platform between the two end platform positions, as illustrated in FIGS. 1 and 2. In FIG. 2, platform 20 is shown as resting on ground level and is adapted to maintain its horizontal position at all positions. As is clearly evident from FIGS. 2, when platform 20 is at ground level, a passenger may use steps 17 for entrance into the bus, it being understood that the passenger who has climbed steps 17 must move out of the way toward driver's seat 10 or toward the rear of the bus (leftward) in order to permit platform 20 to assume the normal rest position illustrated in FIG. 1.

While the support means and platform moving means may assume a wide variety of forms, a simple preferred linkage system is illustrated in FIG. 6. FIG. 6 shows a side elevation of a platform supported by links, such links being disposed at opposite sides of the platform, and cooperating respectively with the front and rear portions of the platform. Referring to FIG. 6, a forward portion of platform 20 is supported on each side by links 22 pivotally secured at 23 to small links 24 which in turn are pivotally secured to generally horizontal links 26. The rear ends of links 26 are pivotally secured at 27 to small links 28 which in turn are pivotally secured at 29 to bell-cranks 30 pivotally secured at 31 to the rear part of platform 20. The linkage system is so proportioned that rotation of links 28 from a suitable source of power will cause platform 20 to move leftward, as seen in FIG. 6, while remaining horizontal and to drop from a position level with the bus floor down to ground level.

For moving links 28 and bell-cranks 30 counter-clockwise, as shown in FIG. 6, a rack and pinion arrangement is provided. However, other means for effecting rotation of pivots 29 may be provided. The rack and pinion arrangement is shown more clearly in FIG. 3 of the drawings and includes pinion 33 operatively associated with racks 34 and 35, each rack extending between opposed pistons of cylinders 36 and 38 for rack 34 and pistons for cylinders 37 and 39 for rack 35. The pistons for cylinders 36 to 39 inclusive are suitably valved so that cylinders 36 and 39 cooperate to rotate pinion 33 in one direction for accomplishing upward movement of platform 20 from ground to bus level. Cylinders 38 and 37 are adapted to work for effecting pinion rotation in the opposite direction to move the platform down from the bus floor level. Other power operated means for effecting rotation of pinion 33 in the desired direction for platform movement may be used. The power for such platform motion may be compressed air or a hydraulic system may be used.

Instead of connecting links 26 between short links 24 and 28 in FIG. 6, there is shown in FIG. 7 a modification wherein pinion 33' can drive pinion 43 supported on crank end 44 for link 22'. Sprockets 45 connect the two pinions. Pinion 33' is rigidly secured to bell-cranks 30'. The actuator previously described may be used in the modification.

Figure 8:
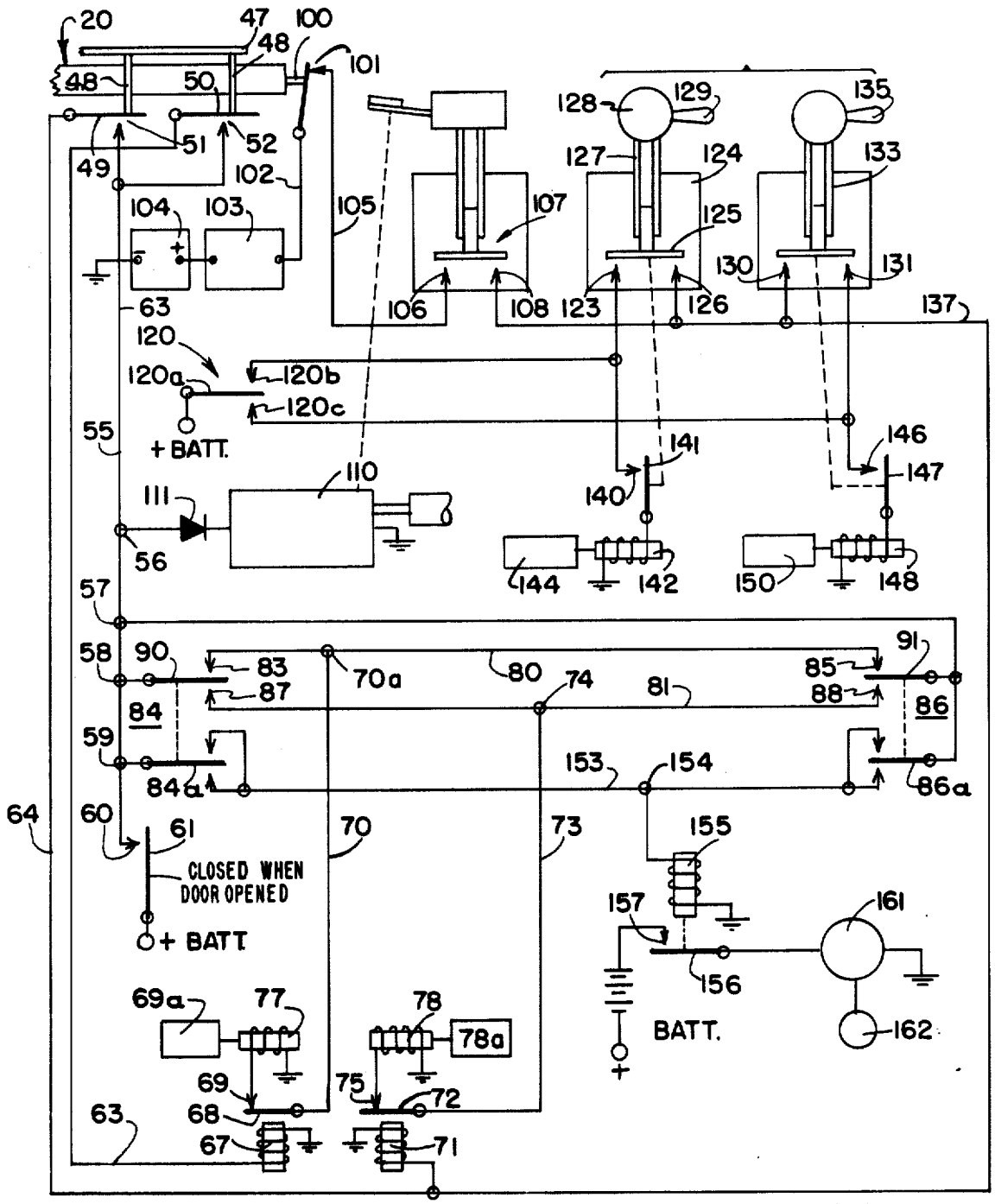
FIG. 8 is a schematic of the hydraulic and electrical system for controlling the operation of the platform power operating means.

Disposed above the top surface of platform 20 are sensing strips 47 which are normally biased upwardly from platform 20 by guide rods 48 and electrical contact 49 and 50 FIG. 8. Electrical movable contact arms 49 and 50 cooperate with stationary contacts, to be later described, to function as sensors for detecting the full and correct placement of a chair on platform 20. The location, dimensions and number of strips 47 are such that a wheel chair must be properly positioned on platform 20 and clear strips 47 before interlock mechanism is released for further operation. It is understood that contact arms 49 and 50 are normally biased upwardly with sensing strips 47 on platform 20 and these movable contact arms cooperate respectively with stationary contacts 51 and 52.

Stationary contacts 51 and 52 are connected to wire 55 and have junction points 56 to 59 inclusive, and end up connected to stationary contact 60 which can cooperate with movable contact 61. Contacts 60 and 61 together provide a switch which is electrically closed when the doors for the bus are open and are electrically open when the doors for the bus are closed. Movable contact 61 of the switch is connected to one terminal of a source of electric power which in this instance is the positive terminal of a battery normally present as part of the bus equipment. The designation of the positive terminal of a source of electric power is arbitrary and is given by way of example only.

Referring to sensing movable contact 50, this is connected to wire 63 while movable contact 49 is connected to wire 64. Wire 63 goes to one terminal of the winding of relay 67, the remaining terminal of the winding being grounded. Relay 67 has normally closed contact 68, this contact being movable and normally closing against fixed contact 69. Movable contact 68 is connected by wire 70 to junction point 70a. Wire 64 is similarly connected to one terminal of a winding of relay 71, whose other terminal is grounded. Relay 71 has movable contact 72 connected to wire 73 going to junction 74. Movable contact 72 of relay 71 is normally closed against stationary contact 75. Stationary contact 69 in relay 67 is connected to one terminal of solenoid winding 77 which controls the feed of air or hydraulic fluid to the actuator cylinders for moving the platform down. Stationary contact 75 is similarly connected to one winding terminal of solenoid 78 which controls air valve 78a to feed air to the platform actuator for up movement thereof. The remaining terminals of the windings for solenoids 77 and 78 are grounded.

Junction points 70a and 74 are on wires 80 and 81 respectively. Wire 80 runs between stationary contact 83 of switch 84 and stationary contact 85 of switch 86. Junction 74 on wire 81 is connected between contacts 87 and 88 of switches 84 and 86 respectively. Switches 84 and 86 are each single pole double throw switches having movable contacts 90 and 91 respectively. One of the switches, such as 84, is located outside of the bus, as for example, to one side of a door and is provided for a person outside the bus to initiate a platform moving cycle. Switch 86 is an interiorly mounted switch within the bus close to the driver and is provided for similar control of platform movement. Switches 84 and 86 are mechanically linked to the movable contacts of companion switches 84a and 86a. The movable contact of 84a is connected to junction point 59 on wire 55. Similarly the movable contact of switch 86a is connected to junction point 57. As is apparent from the circuitry, the movable contacts for switches 84; 84a; 86 and 86a are all connected by wires to junction point 57 and 59 on wire 55.

Referring to the platform sensors, platform 20 carries pin 100 which, when the platform is only in the up position, cooperates with a movable contact of switch 101 which is closed only when the platform is in the up position. Switch 101 is connected by wire 102 to one terminal of circuit breaker 103 whose other terminal is connected to the high side, in this instance the positive terminal, of battery 104. Battery 104 has it negative terminal grounded. Switch 101 has its other contact connected by wire 105 to one contact 106 of a pneumatic switch 107, said switch having the remaining contact 108. Pneumatic switch 107 is operated by compressed air and has a mechanical connection to a brake pedal.

There is a mechanical coupling between the brake pedal and an electromagnetic brake actuating means 110, one terminal of the operating windings being grounded and the other terminal being connected through rectifier 111 to junction point 56 on wire 55. The rectifier is provided to prevent any transient voltage in the electromagnetic operating windings from being fed back into the rest of the system and triggering undesired operation.

Switch 120 is of a single pole double throw variety having a movable contact 120a connected to the positive side of the battery and operating between fixed contact 120b and 120c. Switch 120 is adapted to be operated by the bus doors and when the bus doors are closed, movable contact 120a closes against fixed contact 120b. When the doors are open, movable contact 120a closes against fixed contact 120c. Fixed contact 120b is connected by wire to switch contact 123 of the pneumatically powered switch 124. Switch 124 has movable contact 125 which can connect contact 123 to contact 126 of switch 124. Pneumatic switch 124 has air pipe 127 which can be connected to the source of air pressure for door operation. In this particular instance, valve handle 129 when moved appropriately will supply air to close the bus doors and will at the same time apply air to pneumatic switch 124 to move contact 125 to close contacts 123 and 126. A third pneumatic switch has contacts 130 and 131 and a movable contact which is adapted to close against contacts 130 and 131 upon the presence of air pressure when valve handle 135 is moved downwardly for opening the bus doors. It is understood that valve handle 135 controls a valve for supplying compressed air for opening the bus doors as well as closing pneumatic switch 133.

Pneumatic switch contact 108; 126 and 130 are all connected to wire 137 which is a continuation of wire 64. Pneumatic switch contact 123 is electrically connected to stationary contact 140 while movable contact 141 with which it can cooperate is mechanically connected to movable contact 125 of pneumatic switch 124. Movable contact 141 is connected to one terminal of a solenoid winding 142 whose other terminal is grounded. Solenoid winding 142 is adapted to control air valve 144 for closing the bus doors. Similarly pneumatic switch contact 131 of switch 133 is connected to fixed contact 146 of a switch whose movable contact 147 is connected to one terminal of a solenoid operating winding 148, the remaining terminal of which is grounded. Solenoid 148 is operatively connected to air control valve 150 for door opening.

Referring to switch contacts 84a and 86a - the stationary contacts are connected together by wire 153. Wire 153 has junction 154 thereon which junction is connected to one terminal of relay winding 155 whose remaining terminal is grounded. Relay 155 has normally open movable contact 156 which, when the relay is energized, will close against fixed contact 157 which is connected to the negative or ground terminal of a battery such as battery 104 or a separate battery or any suitable source of electric power. Relay movable contact 156 is connected to one terminal of electric motor 161 coupled to pump 162, the remaining terminal of which is grounded.

Figure 3:
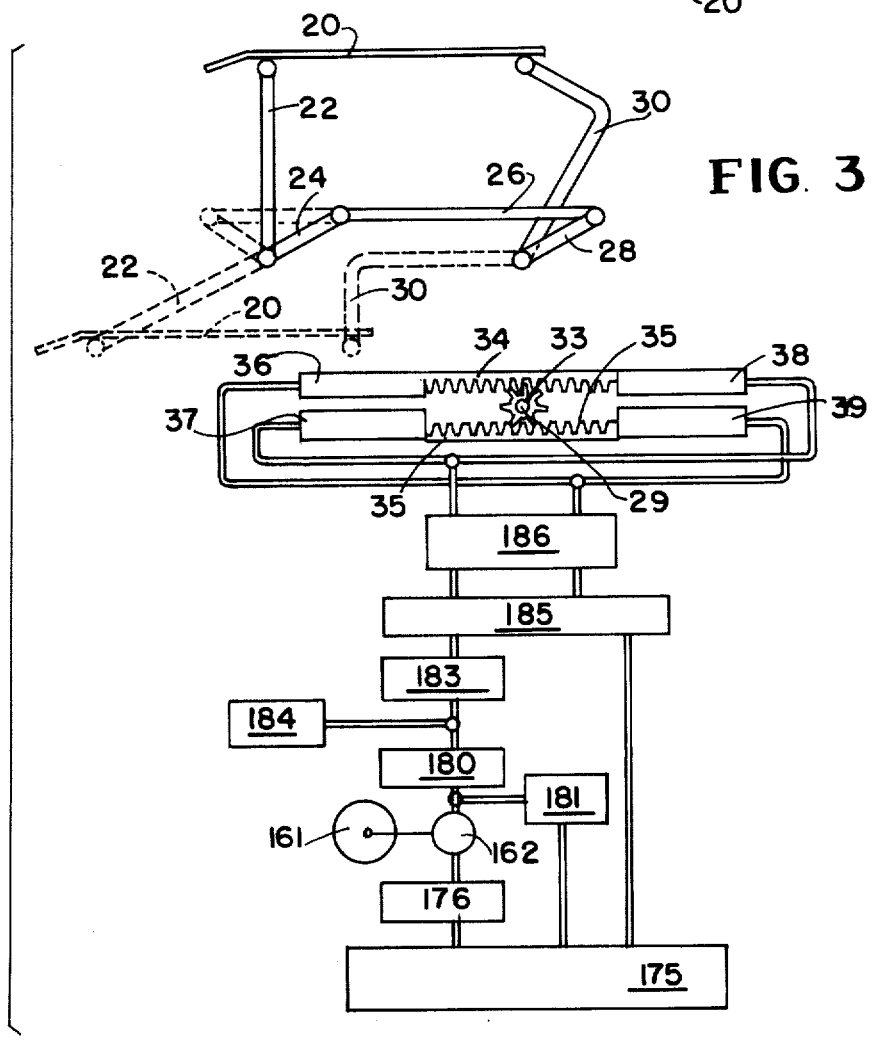
FIG. 3 is a diagrammatic view of the components of the system embodying the present invention, such components being of the hydraulic portion of the system.

Referring to FIG. 3, a diagrammatic illustration of the fluid circuit in the system as shown. A reservoir or tank 175 is adapted to retain air under pressure used in connection with door operation and brake operation on vehicles. The reservoir has an outlet pipe feeding air to filter 176 for preventing entry of dirt into the system. Filter 176 feeds air to the intake of pump 162 driven by electric motor 161. The outlet of pump 162 feeds fluid to check valve 180 and also to relief valve 181 connected back to reservoir 175. The outlet of check valve 180 goes to flow control valve 183 and this same outlet is also connected to an accumulator or surge tank 184 for preventing any sudden changes in air pressure. The outlet of flow control valve 183 goes to solenoid controlled valves 185 with an air pipe connection between reservoir 175 and solenoid controlled valve outlet ports. Solenoid controlled valve 185 have outlets to valves 186 which are of the type which are either fully open or fully closed. This is in distinction to valves containing a bolt or threaded control for adjusting the valve opening. The outlets of valves 186 go to the actuator cylinders illustrated in FIG. 3.

OPERATION OF THE SYSTEM

The operation of the system will now be described.

It will be evident from the schematic of FIG. 8 of the drawing, the lack of sufficient air pressure in pneumatic switches 107, 125 and 133 will prevent any of the switches from closing so that the system is inoperative except for the fact that a brake pedal at the foot of the driver may be depressed to apply the brakes. The door opening and door closing means will not be able to operate since controls 135 and 129 respectively will prevent any operation of the doors of the bus. Assuming that the air pressure is at a satisfactory level and that the source of electric power, such as one or more batteries 104, can energize the various circuits, platform 20 must be in the up position to permit operation of doors. This is because electric switch 101 is closed by pin 100 of the platform only in the up position. Unless this switch is closed, a power circuit through any of the pneumatic switches will not be completed. Hence, with platform 20 in the up position, and with electric switch 101 closed, the following possibilities for operation exist. Pneumatic switch 107 must be closed by the bus operator since the power energizing circuit for either the door closing or door opening control goes through pneumatic switch 107. It is evident therefore that sufficient air pressure and closure of the brakes must be effected. Assuming that platform 20 is still in the up position and that the bus doors are closed, door opening control valve 135 is moved to open the valve. Upon the appearance of air pressure at pneumatic switch 133, contacts 130 and 131 are closed. Movable contact 147 is mechanically connected to pneumatic switch 133 and as a result, solenoid winding 148 is energized to open air valve 150 to feed pressure to the door opening cylinder. For the purpose of opening the door from the outside of the bus, movable contact 120a may be moved down against stationary contact 120c to connect the positive terminal of the battery to fixed contact 146 and thus bypass the platform control switch 101 and the various pneumatic switches to operate solenoid 148.

Door controlled movable contact 61 closed against stationary contact 60 when the door is open. Movable switch contact 61 is directly connected to the plus terminal of the battery and in consequence after the bus doors are open, wire 55 is now live and can furnish power to the various operating circuits connected thereto. Movable switch contact 91 may now be closed against fixed contact 85 of a control switch for initiating movement of platform 20 away from the up position. This internally mounted switch is accessible to the bus driver. An externally mounted platform control switch has movable contact 90 operating between up switch contact 84 and down switch contact 83. It will be noted that these stationary contacts 87 and 88 on the one hand and 83 and 85 on the other hand are respectively connected in parallel and that the movable contacts 90 and 91 are connected by wires 80 and 81 and the movable contacts are connected to wire 55. Assuming either or both movable contacts 90 and 91 are bearing against fixed contact 83 or fixed contact 85 (as a rule only one switch at any time will be operated), power will appear at junction 70a and flow through wire 70 to energize solenoid 77 which controls air valve 69a associated with solenoid 77 for causing the actuator to begin to move platform 20 from its top position toward its lower ground position. The switches associated with platform 20 are unnecessary for this phase of the operating cycle since door control contact 61 is closed against stationary contact 60 so long as the bus doors remain open. The electrical condition of door opening pneumatic switch 133 is unimportant since the bus doors are now open. As far as the bus brakes are concerned, these remain in a closed position due to the fact that junction point 56 on wire 55 feeds power through rectifier 111 to electromagnetic brake actuating means 110. Consequently the electrical condition of pneumatic switch 107 for the brakes is unimportant since platform switch 101 moves away from its top position and thus permits switch contact 101 to open the switch at that point. The door closing air valve 129 is still closed so that the electrical condition of the pneumatic switch 125 is unimportant, although switch 125 will actually be open due to the lack of air pressure to be applied thereto.

Assuming that sensing strip 47 upon platform 20 closes switch contact 51 and movable contact 49, solenoid 71 is energized and pulls contact 72 away from contact 75. Solenoid 78 controls the up travel of the platform. Thus, up travel of the platform is inhibited until the chair on platform 20 is correctly placed. Assuming now that the platform is at ground level and a passenger on the platform leaves the platform or if a passenger comes onto the platform to get into the bus, the following is the cycle of operation. The bus doors are still open so that switch contacts 61 and 60 are closed and the electromagnetic bus brake control is effective to prevent any bus movement. In order to effect platform upward movement, external switch contact 90 is closed against fixed contact 84 or interior contact 91 is closed against fixed contact 88 in a switch readily available to the bus operator. In any event, connecting wire 81 carries current supplied either from junction 57 or 58 from closed switch contacts 60 and 61 (the door is still open).

Due to the mechanical linkage between movable contact 90 and 84a on the one hand and movable contact 91 and 86a on the other hand (one being externally mounted on the bus and the other one being mounted within the bus readily accessible to the bus driver) and irrespective of the direction of movement of the movable contacts 90 and 91, an energizing circuit through normally closed switch contacts 61 and 60 (the doors are still open) permits current to flow through the winding or relay 155, the other remaining terminal of the winding being grounded. Relay 155 when energized closes contacts 156 and 157 to permit battery current to flow through electric motor 161. The motor drives hydraulic pump 162 for building up hydraulic pressure to the desired value for movement of the platform, either up or down.

Upon movement of external switch contact 90 or interior switch contact 91 against the lower fixed contacts of the respective switches, the winding of solenoid 78 is energized. Solenoid 78 is adapted to control the valve for operating the actuator to move the platform up. The operation through to a final up position of the platform, except for the direction of platform movement, is the same as the down position insofar as the actuator operating after the initial energization thereof to complete the platform movement to the up position. It will be noted that once platform 20 reaches its top position, switch 101 is again closed.

Now platform 20 is at its top position and the doors of the bus are still open. Movable contact 120a is now moved upwardly against fixed contact 120b and provides a bypass for battery current to flow to pneumatic switch contact 123 when door closing valve 128 is operated to apply air to the door operating cylinders. An energizing circuit is established from movable contact 120a through fixed contact 120b to fixed contact 140 at the same time movable contact 141 of solenoid 142 will permit door closing valve 144 to apply air pressure to the door closing cylinders. After the doors are closed, switch contacts 60 and 61 are open and power for pneumatically controlled door closing switch 128 must come through the platform control switch 101.

The interlocks on the system will prevent release of any brakes unless sensing strip 47 on the platform indicates that the weight of a platform is properly distributed. Unless both switches on sensing strips 47 are open (as a rule these strips are properly dimensioned and so disposed that a wheel chair will permit the switches to remain open providing the chair is properly disposed on the platform), power from closed contact 101 (due to the platform being in the up position) can flow along wire 105 through the closed brake pneumatic switches and either of the door opening or door closing pneumatic switches to energize wire 64 running into wire 137. Thus when both of the sensing strip switches on platform 20 are open, interlocking prevents further platform travel.

What is claimed is:

1. In an interlocked system for a driver controlled passenger carrying vehicle equipped with power operated doors and power operated brakes, the combination of an electrically controlled brake actuating means, a driver actuated control member for initiating brake application, driver actuated control means for initiating door operation including members for initiating door closing and door opening, respectively, each of said members having a normal, stand-by position from which it is moved to initiate an operation, the brake control member having one switch associated therewith and each door operating member having two switches associated therewith, all switches normally open in the stand-by condition of the associated member and being closed when the associated member is moved to initiate an operation, a power operated horizontal passenger accommodating platform, movable between an up position within the vehicle and a down position on the ground outside said vehicle, a platform up electric switch closed only when said platform is in the up position, a first power circuit through said closed up platform switch and, when operated, through the closed brake switch to one terminal of one door opening switch and to one terminal of one door closing switch; the remaining terminal of the one door opening switch and remaining terminal of the one door closing switch being respectively connected to an electromagnetic means for applying power to a door opening or door closing mechanism, a second power circuit independent of said first power circuit and including the other of said door operating switches and going through a one door two position control switch having door open and door closed positions, for operating doors, whereby when the platform is in the up position and the brakes applied, the driver can open or close doors; a second door control switch controlling a third power circuit and closed only when the doors are open and connected between a source of power and a distributing wire, said distributing wire having a connection to the electric brake actuator for locking brakes in set condition, supplemental circuits for applying power to move said platform in a desired direction, said last named supplemental circuits being connected to said distributing wire whereby platform movement is possible only when said doors are open and vehicle brakes are applied.

2. The system according to claim 1, wherein compressed air is used as a power means for operating doors and for moving the platform, and wherein the switch means controlled by the driver actuated brake control member and by the door operating members include compressed air means for effecting movement of the respective switch means whereby, in the absence of adequate compressed air, circuit control operations will be ineffective.

3. The system according to claim 1, wherein said platform has at the top surface thereof sensing means to define an area on the platform within which passengers must be located during platform movement, normally open switch means operated by said sensing means when a load rests upon said sensing means to close said switch means, said switch means including at least one switch connected between said distributing wire and to means for opening a power circuit to the winding of an electromagnetic device for controlling the application of power to move said platform in the down direction.

4. The system according to claim 3, wherein an additional switch operated by the sensing means and normally open is provided, said additional switch being connected between said distributing wire and to means for opening the power circuit to the operating winding of an electromagnetic device for controlling power to move the platform up, said last named means being also connected to a wire whose circuit is completed through the closed switch of the brake member.

5. The system according to claim 1, wherein the power means for moving said platform from one position to the other include at least one air cylinder provided with a piston coupled to a rack, pinion means cooperating with said rack and turned thereby, and means coupling said pinion means and platform for effecting platform movement while maintaining the same horizontal.

6. The system according to claim 5, wherein the means for coupling said pinion means and platform include a linkage system operated by said pinion means.

7. The system according to claim 5, wherein four air cylinders are provided, each cylinder having its own piston, two cylinders operating in tandem for one direction of rack movement and the other two cylinders operating in tandem for reverse direction of rack movement, said racks being disposed on opposite sides of the pinion means, and means for coupling said pinion to said platform.

8. The system according to claim 7, wherein linkage means are coupled between said pinion and platform whereby rotation of the pinion will cause motion of said linkage for translating the platform.

9. A platform assembly for use in a passenger carrying vehicle controlled by a driver, said platform assembly being adapted to transport at least one passenger from the ground outside of said behicle to the floor level of the vehicle within the same, said assembly comprising at least one compressed air cylinder having a piston therein, a rack attached to said piston, a compressed air supply pipe connected to the cylinder for effecting rack travel and pinion rotation in a desired direction, a linkage system coupled to said pinion, a passenger carrying platform supported by said linkage system in a horizontal position, said linkage system including members so proportioned and shaped as to maintain said platform horizontal at all times but movable from an up position on the floor of the vehicle within said vehicle and a down position outside of said vehicle and substantially on the ground, sensing means on the top face of said platform for defining an area within which passengers must remain during platform travel, electric switch means controlled by said sensing means and operated thereby when a load is on said sensing means, said platform being adapted to be connected to interlocked means in said vehicle for confining the operation of said platform only when the vehicle has its brakes set and has its doors open, said switch means controlled by said sensing means being adapted to be connected to an electrical lock-out system for preventing any platform movement when said sensing means responds to the weight of a load.

10. The system according to claim 9, wherein the means for coupling said pinion means and platform include a linkage system operated by said pinion means.

11. The system according to claim 10, wherein four air cylinders are provided, each cylinder having its own piston, two cylinders operating in tandem for one direction of rack movement and the other two cylinders operating in tandem for reverse direction of rack movement, said racks being disposed on opposite sides of the pinion means.

\* \* \* \* \*